Figure 4:
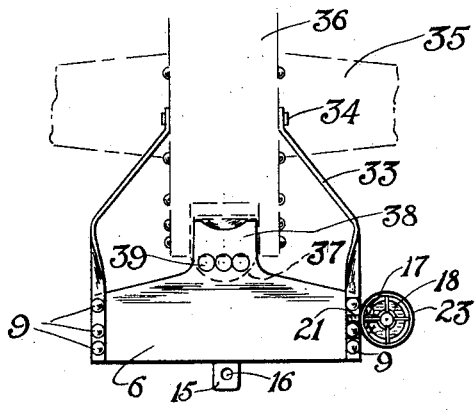

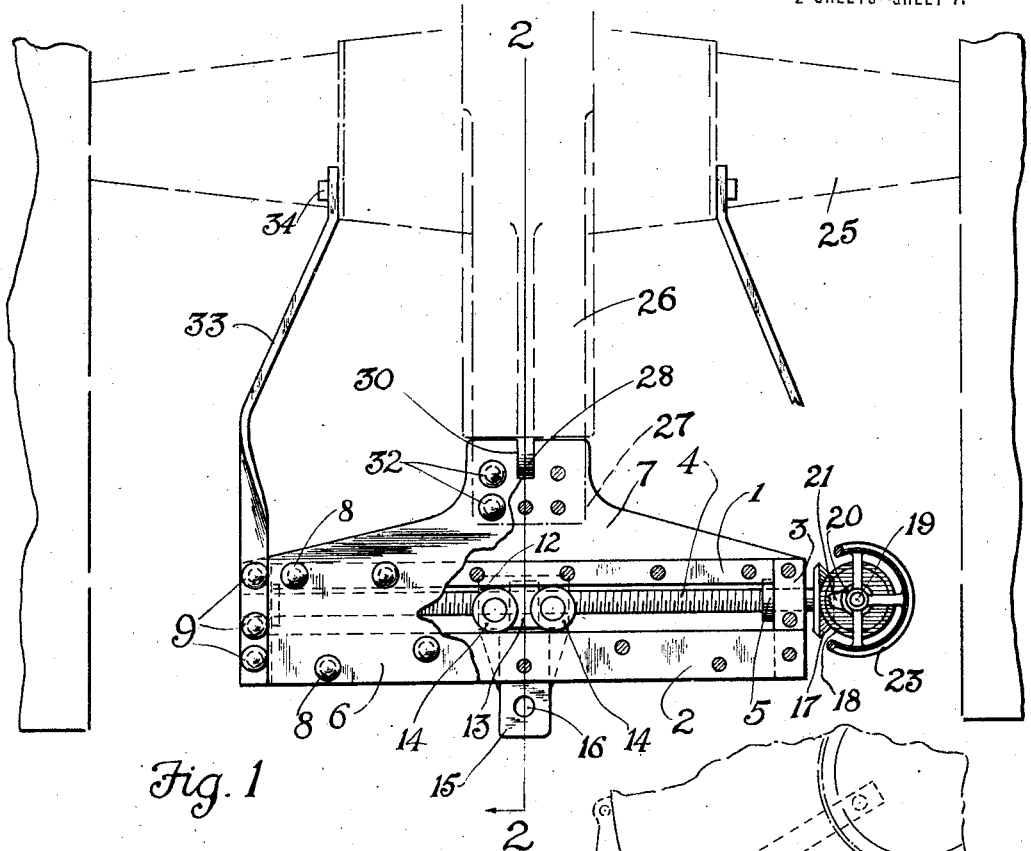
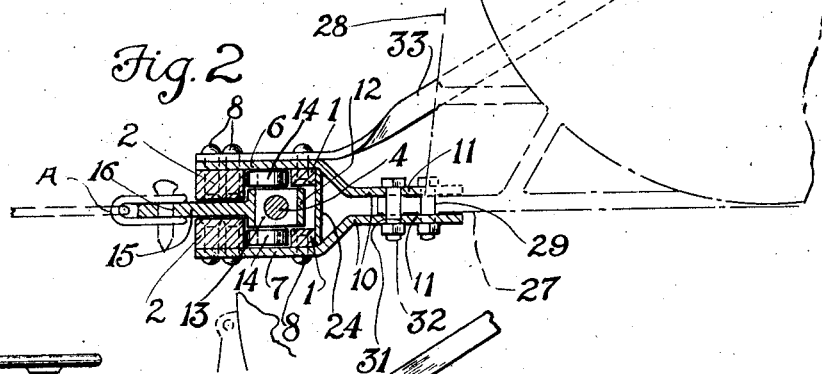
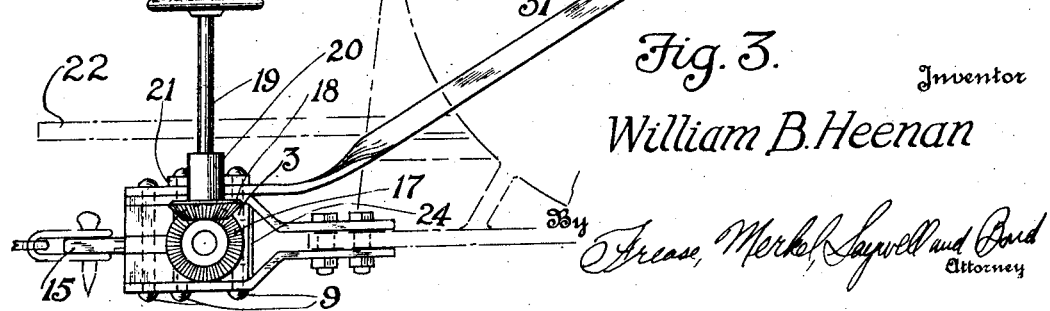

W. B. HEENAN.
ADJUSTABLE TRACTOR HITCH.
APPLICATION FILED FEB. 5, 1921.

1,405,916.

Patented Feb. 7, 1922.
2 SHEETS—SHEET 2.

Inventor
William B. Heenan

By Frease, Merkel, Saywell and Bond
Attorney

UNITED STATES PATENT OFFICE.

WILLIAM B. HEENAN, OF COLUMBUS, OHIO.

ADJUSTABLE TRACTOR HITCH.

1,405,916. Specification of Letters Patent. Patented Feb. 7, 1922.

Application filed February 5, 1921. Serial No. 442,680.

*To all whom it may concern:*

Be it known that I, WILLIAM B. HEENAN, a citizen of the United States, residing at Columbus, in the county of Franklin and State of Ohio, have invented a new and useful Adjustable Tractor Hitch, of which the following is a specification.

This invention relates to adjustable tractor hitches designed to be connected to the rear axle housing of a tractor for the purpose of connecting a plow or other agricultural implement to the tractor in such a manner that the plow or other implement may be easily and readily moved from side to side at the will of the operator.

The invention is especially designed for use of tractors used in plowing hilly ground where it is necessary to head the plow slightly up hill in order to overcome the effects of the sloping ground, and as the degree of slope frequently changes, it is necessary to change the draft to correspond.

The device is also adapted for use in hitching a binder to the tractor, as the binder may be off-set in order to prevent the tractor from crowding the standing grain. In plowing curves upon level ground, the device will also be of great advantage.

It is understood that adjustable tractor hitches have been provided for the earlier form of tractor in which the gearing is all exposed, the tractor hitch being connected permanently to or forming a part of the frame of the tractor. The modern tractors are provided with housings which entirely enclose all of the gearing, and there are three well known styles of tractors of this type at present in use, namely the Samson, the Wallis and the Fordson.

Each of the above mentioned tractors is designed to have the clevis of the plow or other implement attached directly to a tractor hitch which forms a part of the rear axle housing of the tractor, and it is the object of the present invention to provide an adjustable tractor hitch arranged to be connected directly to this permanent tractor hitch upon the rear axle housing of the tractor, the construction of the tractor hitch proper being the same for all forms of tractors, a slightly different attaching plate being provided to accommodate each of the three styles of tractors.

Further objects of the invention are to simplify and improve the operation of the adjustable hitch and to provide a device of this character which may be easily and readily attached to a tractor of the type above mentioned, and which may be easily operated from the driver's seat.

With these objects in view the invention consists in the construction and arrangement of parts hereinafter described and illustrated in the accompanying drawings, it being understood that various changes may be made within the scope of the appended claims.

The invention thus set forth in general terms is illustrated in the accompanying drawings in which, Figure 1 is a plan view of a tractor hitch embodying the invention, showing the same attached to the rear axle housing of a Samson tractor, parts being broken away for the purpose of illustration;

Fig. 2 is a section on the line 2—2, Fig. 1;

Fig. 3, an end elevation of the construction shown in Fig. 1;

Fig. 4, a plan view of the tractor hitch showing the same attached to the Fordson tractor.

Figure 5:
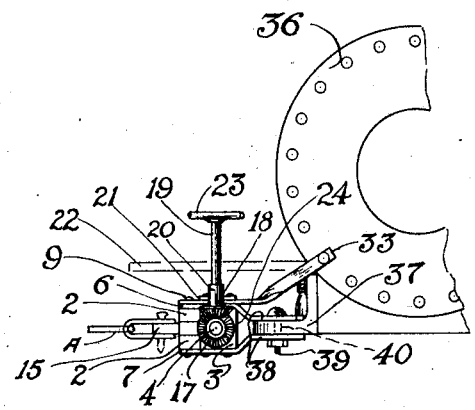
Figure 6:
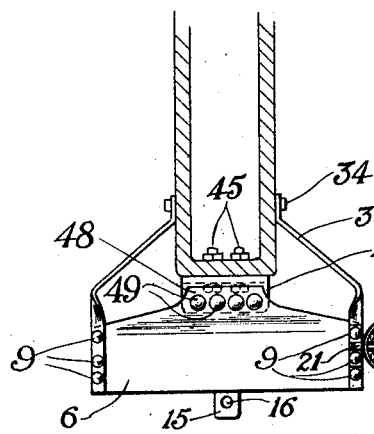

Fig. 5, a side elevation of the device shown in Fig. 4;

Fig. 6, a plan view of the tractor hitch attached to the Wallis tractor; and

Figure 7:
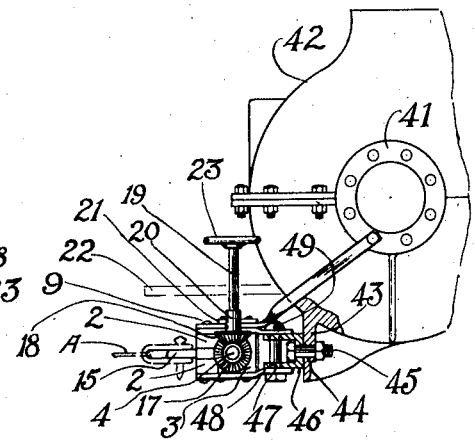

Fig. 7, a side elevation of the device shown in Fig. 6.

A practical embodiment of the invention is disclosed in the accompanying drawings forming a part of this specification in which similar numerals of reference indicate corresponding parts throughout the several views.

The tractor hitch to which the invention pertains includes a frame comprising the forward and rear pairs of guide members 1 and 2 respectively, connected at their extremities by means of the blocks 3, each of which forms a bearing for the extremities of the threaded shaft 4, ball bearings 5 being preferably provided for said bearings.

The forward guide members 1 are preferably of considerably less cross-sectional area than the rear guide members 2. Upper and lower steel plates 6 and 7 respectively are connected to the guide members by means of rivets 8, or their equivalents. Bolts 9 connect the end blocks 3, rigidly to the guide members and plates.

The plates 6 and 7 completely cover the upper and lower sides of the frame and each plate is provided with the forwardly extended reduced portion 10, said reduced portion being bent toward the longitudinal center of the frame as at 11.

A block 12 is slidably mounted upon the threaded shaft 4 and is preferably provided with a removable nut 13, which engages the threaded shaft, rollers 14 being mounted upon the upper and lower sides of the block and arranged to engage the forward faces of the rear guide members 2, said rollers being normally slightly spaced from the forward guide members 1.

The block extends between the forward guide members as shown in Fig. 2, and is provided with an integral draw bar 15 which extends rearwardly, between the rear guide members and is provided with an opening 16, serving as means for the attachment of the beam of a plow or other agricultural implement, indicated at A.

For the purpose of rotating the threaded shaft 4, in order to move the block 12 laterally within the guide frame, a beveled pinion 17 is fixed upon one end of a shaft 4 and meshes with a pinion 18 mounted upon the hand wheel shaft 19 which is journaled within a bearing 20 carried upon a bracket 21, mounted upon the guide frame, said hand wheel shaft being designed to extend through the usual platform 22 of the tractor and being provided upon its upper end with a hand wheel 23 located in a convenient position to be operated by the driver.

For the purpose of preventing dirt and dust from falling upon the threaded shaft and the guide faces of the members 1 and 2, a sheet metal shield 24 is provided upon the forward guide members 1, as shown in Fig. 2.

The form of the invention illustrated in Figs. 1, 2 and 3 is designed for use upon the Samson tractor, portions of which are shown in dot and dash lines in these figures. This tractor is provided with the rear axle housing 25 which communicates with the master gear housing 26. The usual tractor hitch 27, upon this type of tractor is formed integrally with the master gear housing 26 and provided with a vertical web 28, a plurality of apertures 29 being formed in said hitch 27 for the reception of the usual clevis of the plow or other implement.

For the purpose of attaching my adjustable tractor hitch to this portion of the tractor the forward extensions 10 are provided upon the plates 6 and 7, the hitch portion 27 of the tractor being received between said extensions as shown in Fig. 2. The extension upon the upper plate 6 is provided with a slot 30 to receive the web 28 and is provided with apertures 31 registering with the apertures 29 in the hitch portion 27 of the tractor, bolts 32 being passed through said apertures to fixedly connect the adjustable tractor hitch to the portion 27 upon the rear axle housing of the tractor.

For the purpose of providing a rigid connection, the brace bars 33 are connected to each end block 3 of the adjustable hitch by the bolts 9 and are attached by suitable bolts 34 to the rear axle housing.

In Figs. 4 and 5 is illustrated a tractor hitch embodying the invention provided with an attaching plate adapted for connection with the Fordson tractor.

A portion of the rear axle housing is indicated at 35 and a portion of the master gear housing at 36, the usual tractor hitch portion 37 being adapted to receive the extensions 38 of the plates 6 and 7 of the adjustable tractor hitch, bolts 39 being passed through the apertures 40 in the extension 38 and similar apertures in the hitch portion 37. The remaining portion of the adjustable tractor hitch is the same as shown in Figs. 1 to 3 inclusive and above described.

In Figs. 6 and 7 is shown an adjustable tractor hitch embodying the invention applied to the Wallis tractor. All of the parts of the tractor hitch are of the same construction as above described with the exception of the attaching means. A portion of the rear axle housing is shown at 41, and a portion of the master gear housing is shown at 42. In the Wallis tractor a depending flange 43 is formed upon the master gear housing to which the usual tractor hitch portion is attached, apertures 44 being formed therein for the reception of the bolts 45 by means of which the channel 46 is attached, this channel being provided with apertures 47 to receive the plow clevis.

The extensions 48 in this form of the device are arranged to be located upon the top and under sides of the channel 46, bolts 49 being located through the apertures 47 in the channel and through suitable apertures in the extensions 48.

It will thus be seen that an adjustable tractor hitch is provided which includes an attaching plate adapted to be easily and readily connected to the rear axle housing of any of the modern types of tractor in which the gearing is enclosed within a housing, it not being necessary to make any change at all in the construction of the tractor in order to attach my improved tractor hitch thereto.

I claim:

1. An adjustable tractor hitch comprising front and rear pairs of spaced guide members, a threaded shaft operatively mounted between said guide members, a block operatively mounted upon said threaded shaft, spaced pairs of rollers upon the upper and lower sides of said block positioned to engage the rear guide members, a draw bar rigidly connected to the block and extended between the rear guide members and plates connected to the upper and lower sides of said guide members and arranged to be attached to the upper and lower sides of the hitch portion of a tractor.

2. An adjustable tractor hitch comprising front and rear pairs of spaced guide members, a threaded shaft operatively mounted between said guide members, a block operatively mounted upon said threaded shaft, spaced pairs of rollers upon the upper and lower sides of said block positioned to engage the rear guide members, a draw bar rigidly connected to the block and extended between the rear guide members and plates connected to the upper and lower sides of said guide members and provided with spaced extensions adapted to receive, and be attached to, the hitch portion of a tractor.

In testimony that I claim the above, I have hereunto subscribed my name.

WILLIAM B. HEENAN.